United States Patent
Reuven et al.

(10) Patent No.: US 9,020,056 B2
(45) Date of Patent: Apr. 28, 2015

(54) TRANSMISSION SCHEME FOR MULTIPLE-INPUT COMMUNICATION

(75) Inventors: Ilan Reuven, Ramat Gan (IL); Rami Verbin, Tel Aviv (IL)

(73) Assignee: SIGMA Designs Israel S.D.I. Ltd., Tel Aviv (IL)

( * ) Notice: Subject to any disclaimer, the term of this patent is extended or adjusted under 35 U.S.C. 154(b) by 305 days.

(21) Appl. No.: 13/187,270

(22) Filed: Jul. 20, 2011

(65) Prior Publication Data
US 2012/0020423 A1    Jan. 26, 2012

Related U.S. Application Data

(60) Provisional application No. 61/365,898, filed on Jul. 20, 2010.

(51) Int. Cl.
| | | |
|---|---|---|
| *H04B 7/02* | (2006.01) | |
| *H04B 7/06* | (2006.01) | |
| *H04B 3/54* | (2006.01) | |
| *H04B 7/08* | (2006.01) | |
| *H04B 7/04* | (2006.01) | |

(52) U.S. Cl.
CPC .............. *H04B 7/0689* (2013.01); *H04B 3/54* (2013.01); *H04B 3/542* (2013.01); *H04B 7/0413* (2013.01); *H04B 7/0871* (2013.01); *H04B 2203/5408* (2013.01); *H04B 2203/5466* (2013.01)

(58) Field of Classification Search
CPC ......................................................... H04L 1/06
USPC .......................................................... 375/267
See application file for complete search history.

(56) References Cited

U.S. PATENT DOCUMENTS

| | | | | |
|---|---|---|---|---|
| 5,907,583 | A * | 5/1999 | Sakoda et al. ................. | 375/260 |
| 6,134,273 | A * | 10/2000 | Wu et al. ........................ | 375/261 |
| 7,895,503 | B2 * | 2/2011 | Walton et al. .................. | 714/774 |
| 8,121,235 | B1 * | 2/2012 | Sun et al. ....................... | 375/347 |
| 8,160,162 | B2 * | 4/2012 | Stadelmeier et al. .......... | 375/257 |
| 8,238,483 | B2 * | 8/2012 | Erell et al. ..................... | 375/340 |
| 8,270,505 | B2 * | 9/2012 | Stadelmeier et al. .......... | 375/260 |
| 8,295,401 | B2 * | 10/2012 | Olesen et al. .................. | 375/299 |
| 2004/0242156 | A1 * | 12/2004 | Tiirola et al. ................... | 455/25 |
| 2005/0025271 | A1 * | 2/2005 | Molisch et al. ................ | 375/347 |
| 2005/0213686 | A1 * | 9/2005 | Love et al. ..................... | 375/299 |
| 2006/0156087 | A1 * | 7/2006 | Lin et al. ........................ | 714/713 |
| 2007/0054633 | A1 * | 3/2007 | Piirainen ..................... | 455/115.3 |
| 2009/0041151 | A1 * | 2/2009 | Khan et al. ..................... | 375/267 |
| 2009/0141691 | A1 * | 6/2009 | Jain ................................ | 370/338 |
| 2010/0081467 | A1 * | 4/2010 | Alex et al. ...................... | 455/509 |
| 2010/0278278 | A1 * | 11/2010 | Lee et al. ....................... | 375/267 |

\* cited by examiner

*Primary Examiner* — Lihong Yu
(74) *Attorney, Agent, or Firm* — Merchant & Gould P.C.

(57) ABSTRACT

Method for transmitting and receiving signals over at least one channel between at least one transmitter and at least one receiver, the channel comprising at least one group of sub-channels, the group comprising at least one sub-channel, including the procedures of estimating at least one line characteristic of the channel and selecting a transmission scheme for each group of the at least one group of sub-channels according to the estimated line characteristic, wherein the transmission scheme is selected between a single spatial stream transmission scheme and a multiple spatial stream transmission scheme.

33 Claims, 3 Drawing Sheets

TRANSMISSION SCHEME FOR MULTIPLE-INPUT COMMUNICATION

This application claims benefit of U.S. Ser. No. 61/365,898, filed 20 Jul. 2010 and which application is incorporated herein by reference. To the extent appropriate, a claim of priority is made to the above disclosed application.

FIELD OF THE DISCLOSED TECHNIQUE

The disclosed technique relates to multiple-input communication, in general, and to methods and systems for enabling multiple-input communication in conjunction with OFDM modulation, in particular.

BACKGROUND OF THE DISCLOSED TECHNIQUE

Over the past two decades several communication techniques, such as transmission schemes, have been developed that use multiple transmitters or transmit antennas and/or multiple receivers or receive antennas. The aim of these transmission schemes has been to achieve higher data transfer rates and/or higher reliability of the communication link between transmitter and receiver, especially in communication links with varying channels. These techniques are nowadays in widespread use and are essentially standards in different radio communication configurations.

One of these techniques, known as MIMO (multiple-input and multiple-output), typically consists of a system having t transmitters and r receivers. At a given time instant, the t transmitters send dependent or independent data $(x_1, x_2, \ldots, x_t)$ simultaneously over a channel and in the same frequency band, thereby sending the data over a composite channel. The data may be modulated using an OFDM (orthogonal frequency-division multiplexing) scheme, whereby multiple symbols (i.e., data) can be modulated simultaneously over a plurality of sub-carriers and transmitted over a plurality of corresponding sub-channels. At the receiver end, r receivers (for example, receive antennas) are employed. The composite channel is characterized by an r×t channel transfer matrix H. Entries in such a matrix can be referenced as $H_{i,j}$, where each entry represents the transfer response from transmitter j to receiver i. In a MIMO-OFDM system, this configuration is used to characterize each one of the individual sub-carriers (i.e., the tones) such that the MIMO data is arranged in an orderly manner over the OFDM modulation. Such a configuration can be mathematically formalized by the following relation:

$$y = Hx + n \quad (1)$$

where x is a transmit vector defined as $x = [x_1, x_2, \ldots, x_t]^T$, y is a receive vector defined as $y = [y_1, y_2, \ldots, y_r]^T$ and n is a noise vector defined as $n = [n_1, n_2, \ldots, n_r]^T$. In an expanded matrix form, Equation (1) can be rewritten as:

$$\begin{aligned} y_1 &= h_{11} \cdot x_1 + h_{12} \cdot x_2 + \ldots + h_{1t} \cdot x_t + n_1 \\ y_2 &= h_{21} \cdot x_1 + h_{22} \cdot x_2 + \ldots + h_{2t} \cdot x_t + n_2 \\ &\vdots \\ y_r &= h_{r1} \cdot x_1 + h_{r2} \cdot x_2 + \ldots + h_{rt} \cdot x_t + n_r \end{aligned} \quad (2)$$

As shown in Equations (1) and (2), by traversing from the transmitter end to the receiver end, the independent signals $\{x_1, x_2, \ldots, x_t\}$ are all combined in each one of the receivers. In order to recover each transmitted data stream $\{x_j\}$ from the received data streams $\{y_1, y_2, \ldots, y_r\}$, the channel matrix response is to be estimated and then Equations (1) and (2) are to be solved.

A variety of MIMO arrangements are known in the art. Such arrangements may differ in the number of transmit and receive ports. Two basic MIMO schemes currently used in communication systems are spatial multiplexing (herein abbreviated SM) and space-time transmit diversity (herein abbreviated STTD). In SM, independent data streams (i.e., spatial streams) are transmitted over different transmit ports and capacity gain is achieved. In STTD, in contrast to the SM scheme, the total number of transmit ports may surpass the total number of receive ports. In transmit diversity schemes (for example, beam-forming), a signal is transmitted redundantly through multiple transmit ports, thereby obtaining diversity gain and increased robustness of the communication link. In these schemes, a single spatial stream is mapped to multiple transmitters.

The basis for diversity gain in traditional receiver diversity schemes is that each receiver receives a different copy or combination of the transmitted signals. In wireless communication links, the probability that all of the received signals will experience high attenuation is considerably reduced. This diversity gain can also be achieved by employing multiple transmitters and repeating the same information from different transmitters as is done in space-time codes. These codes make the spatial diversity usable. In these codes, the redundant signal copies are transmitted not only from a different transmit port but also at a different time. Such coding schemes can also be applied in the frequency domain. The frequency domain counterpart to these coding schemes is called space-frequency coding. In a spatial multiplexing scheme however, MIMO arrangements are used to increase the spectral efficiency of the communication link instead of improving its robustness. An increase in spectral efficiency means an increase of the data transfer rate without consuming extra frequency bandwidth. In this scheme, multiple data streams, which originate from multiple independent data streams or from a single data stream divided into separate streams, are transmitted independently in parallel from the different transmitters. In general, there is an approximate linear increase in the achievable data transfer rate with every additional transmitter-receiver pair. Another MIMO scheme which is used in multi-user communication links, such as the uplink of cellular networks, is known as collaborative MIMO. In this scheme, multiple users collaboratively transmit over the same channel to a single destination.

In general, in order to maximize use of the channel capacity and enhance the robustness of a communications system, the transmitted signal should be adapted to the channel conditions. In one set of schemes, a receiver estimates the channel matrix response and channel state information. The receiver then may or may not convey the channel state information back to a transmitter via a special feedback channel. In a closed-loop MIMO arrangement, the channel state information is conveyed back to the transmitter, which enables the transmitter to respond to changing channel conditions and to modify the transmission of the transmitted signals. In an open-loop MIMO arrangement, the channel state information is not conveyed back to the transmitter. Another transmission scheme that attempts to maximize channel capacity is based on a closed-loop MIMO arrangement. In this scheme, the channel matrix response is transformed to its singular value decomposition. Based on this decomposition, the transmitter uses a substantially unitary precoder to transmit the signals which are derived from this matrix decomposition.

OFDM is a prevalent modulation scheme adopted by many state of the art communication standards. MIMO-OFDM systems combine the spectrally efficient OFDM modulation with a MIMO configuration in order to achieve a high communication system robustness or high data transfer rate. A MIMO-OFDM system transmits independent but synchronized OFDM symbols from different transmitters simultaneously. At the receiver, the MIMO decoding follows the OFDM modulation. In MIMO-OFDM schemes, the MIMO processing of the different sub-carriers in both the transmitter and receiver is accomplished independently of the other sub-carriers.

SUMMARY OF THE PRESENT DISCLOSED TECHNIQUE

It is an object of the disclosed technique to provide a novel method and system for optimizing a transmission scheme between a transmitter and a receiver. In accordance with the disclosed technique, there is thus provided a method for transmitting and receiving signals over at least one channel between at least one transmitter and at least one receiver, the channel including at least one group of sub-channels, the group including at least one sub-channel. The method includes the procedures of estimating at least one line characteristic of the channel and selecting a transmission scheme for each group of the at least one group of sub-channels according to the estimated line characteristic. The transmission scheme is selected between a single spatial stream transmission scheme and a multiple spatial stream transmission scheme.

In accordance with another aspect of the disclosed technique, there is thus provided a transmitter, for use in a communications system over at least one channel between the transmitter and at least one receiver. The transmitter includes at least one forward error correction (FEC) encoder, a stream parser, a plurality of constellation mappers, a spatial mapper, a plurality of Fourier transformers and a plurality of processors. The stream parser is coupled with the FEC encoder and the plurality of constellation mappers is coupled with the stream parser via a plurality of single stream paths. The spatial mapper is coupled with the plurality of constellation mappers, the plurality of spatial transformers is coupled with the spatial mapper and the plurality of processors is respectively coupled with the plurality of Fourier transformers. The FEC encoder is for encoding data to be transmitted, the stream parser is for dividing the encoded data into the plurality of single stream paths and the plurality of constellation mappers is for respectively mapping the encoded data of each one of the plurality of single stream paths to a plurality of constellation symbols. The spatial mapper is for spatially mapping the constellation symbols to a plurality of transmit paths, the plurality of Fourier transformers is for transforming the plurality of transmit paths to a plurality of time-domain transmit streams and the plurality of processors is for processing the plurality of time-domain transmit streams and for routing the plurality of time-domain transmit streams to respective transmit ports of the transmitter.

In accordance with a further aspect of the disclosed technique, there is thus provided a method for channel reconstruction of a large constellation over two transmitted data streams, including the procedures of expending an information bit in one of the two transmitted data streams, and using the expended information bit to enable a dual representation of the large constellation as a 1-bit smaller constellation.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique provides a system and method for channel estimation as required in MIMO systems. In addition the disclosed technique relates to a novel transmission scheme, including an optimized method for selecting between different transmission modes such as a transmission of a single spatial stream, and various schemes for the transmission of multiple spatial streams.

Figure 1:
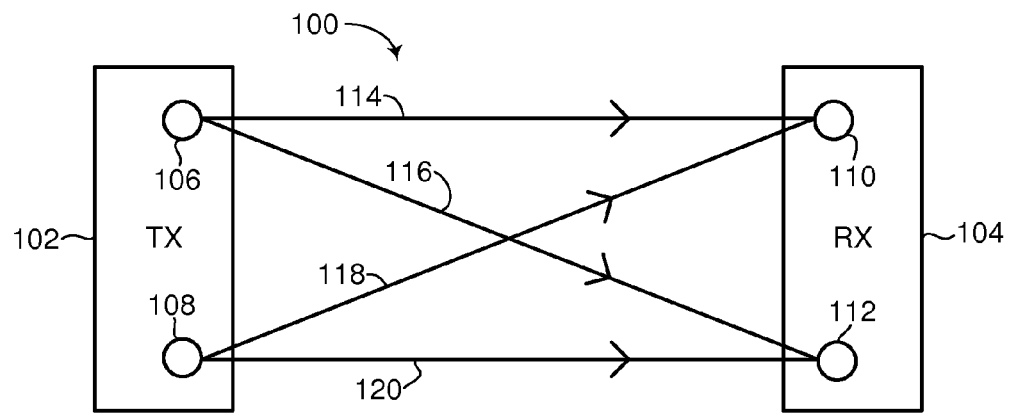
FIG. 1 is a schematic illustration of the communication channels in a MIMO network, constructed and operative in accordance with an embodiment of the disclosed technique.

It is noted that the disclosed technique refers to method for transmitting signals between at least one transmitter and at least one receiver where the communication between the transmitters and receivers is over at least one channel. This channel may include at least one sub-channel or a plurality of sub-channels. Throughout the description, an example of a sub-channel is used to describe the disclosed technique, where a sub-channel is defined as a corresponding OFDM sub-carrier. The use of the term sub-carrier throughout the description is therefore merely an example of the possible types of sub-channels which can be used with the disclosed technique. In general, the performance of a MIMO system is very sensitive to the reliability of the channel estimate and the numerical stability of its inverse. An example of such a system relates to a MIMO system having a two transmitter multiple receiver configuration. Reference is now made to FIG. 1, which is a schematic illustration of the communication channels in a MIMO network, generally referenced 100, constructed and operative in accordance with an embodiment of the disclosed technique. In the art of analog and digital communication, the physical medium over which a signal can be transferred can be referred to as a channel. In digital communication, the frequency, or frequency range used to transmit data (i.e., a signal) can also be referred to as a channel, such as the channels radio stations use to transmit radio broadcasts. In order to transfer a signal over a channel, a transmitter is required to send, i.e. transmit, the signal over the channel. The signal is then received by a receiver coupled with the same channel, which accepts the signal. For example, a radio signal transmitted by a transmitter at 99.9 megahertz (herein abbreviated MHz) can be received by a radio tuned to 99.9 MHz, i.e., the receiver in the radio is set to the specific channel, 99.9 MHz, used to transmit the radio signal. In the field of digital communication, devices which can transmit and receive signals (i.e. data) over various types of cables, such as fiber optic cables, telephone wires, Ethernet cables and electrical cables, are substantially referred to as modems. Modems may be designed to transmit data over a single channel or over a plurality of channels. State of the art modems usually have one transmitter and one receiver. State of the art modems can also transmit and receive signals wirelessly.

In the field of radio, cellular and wireless communication, various types of communication configurations are known in the art. One such configuration is known as a MIMO configuration, in which multiple transmitters transmit a signal over multiple channels and multiple receivers are used to receive the signal transmitted over the multiple channels. According to the disclosed technique, a MIMO configuration is used in which two transmit ports are used. In a MIMO configuration, a signal can be transmitted over a direct communication channel as well as over a crosstalk communication channel. FIG. 1 includes a transmitter 102, a receiver 104, a first transmit port 106, a second transmit port 108, a first receive port 110, a second receive port 112, a first direct channel 114, a first crosstalk channel 116, a second crosstalk channel 118 and a second direct channel 120. It is noted that first direct channel 114, first crosstalk channel 116, second crosstalk channel 118 and second direct channel 120 do not represent physical channels coupling transmitter 102 and receiver 104, but rather the communication channel model between transmitter 102 and receiver 104. For purposes of simplicity, the term transmitter will herein be abbreviated TX and the term receiver will herein be abbreviated RX. TX 102 and RX 104 are coupled via the transmission channels shown, meaning the transmission channels shown represent the various channels through which data can be transferred from TX 102 to RX 104. In general, TX 102 is part of a modem (not shown) which is coupled with a node in a network. The network may be an ad-hoc network. RX 104 is also part of a modem (not shown), which is coupled with another node in a network (not shown). For purposes of simplicity and to demonstrate the disclosed technique, only the TX of the node transmitting the signals is shown and only the RX of the node receiving the signals is shown in FIG. 1. As mentioned above, each node will have a modem coupled with it, the modem including a TX and an RX, meaning each node can communicate (i.e., transmit and receive) with every other node. Also in general, a TX and an RX are each coupled to respective processors which can modify, encode/decode and process data signals.

In a MIMO configuration, each TX transmits a signal to each RX. In FIG. 1, each transmit port and receive port pair can be considered a different communication channel for transmitting and receiving and each port (transmit or receive) can be considered a communication terminal. Therefore, first transmit port 106 can be considered a first transmission communication terminal, second transmit port 108 can be considered a second transmission communication terminal, first receive port 110 can be considered a first receiving communication terminal and second receive port 112 can be considered a second receiving communication terminal. In the MIMO configuration of FIG. 1, per each signaling period, each transmitter transmits a signal. A noisy version of this signal is received by both receive ports via the respective channel connection with that transmitter. First receive port 110 receives a noisy version of the signal originating from first transmit port 106 via first direct channel 114. Second receive port 112 receives a noisy version of the same signal originating from first transmit port 106 via first crosstalk channel 116. The signal originating from second transmit port 108 is received by first receive port 110 and second receive port 112 via the respective channel connections to second transmit port 108, namely second crosstalk channel 118 and second direct channel 120. A direct transmission channel is when both the receiving communication terminal and the transmission communication terminal are substantially the same channel. Since signals transmitted in wireless communication systems are electromagnetic radiation, signals can be picked up by receiving communication terminals on channels other than the transmission channel over which the signals were originally transmitted over. Likewise, even in wired communication systems, such as power line communication systems or multi-pair copper wires, signals transmitted over one channel are coupled via radiation with adjacent wired channels which are purported to be isolated from the other channels. This phenomenon is known as crosstalk in wired communication systems. This is represented in FIG. 1 as a crosstalk channel.

It is noted that the communication channels shown in FIG. 1 are always present in a MIMO communication network. In other words, the signal transmitted over first transmit port 106 is received by both first receive port 110 and second receive port 112. Likewise, an independent or dependent signal transmitted over second transmit port 108 is received by both first receive port 110 and second receive port 112. In a MIMO setup, more than two receivers may be present in RX 104 (not shown) and more than two crosstalk channels (not shown) may be present in MIMO network 100. The processor (not shown) coupled with RX 104 can separate the data which originated from each transmit port, as described below.

With reference to Equations (1) and (2) mentioned above and examining a specific receiver, m, then in general, the channel response from the two transmitters (or two transmit ports) to this receiver may be extracted using a known training signal (or a decoded sequence) at two, or more, typically successive time instants, during which any change in the channel is considered negligible. This setup of receiver m can be stated formally as:

$$y_m(t_1) = h_{m,1} x_1(t_1) + h_{m,2} x_2(t_1)$$

$$y_m(t_2) = h_{m,1} x_1(t_2) + h_{m,2} x_2(t_2) \quad (3)$$

The set of equations shown in Equation (3) cannot be solved for $h_{m,1}$ and $h_{m,2}$ whenever the following condition is true:

$$x_1(t_1) \cdot x_2(t_2) - x_1(t_2) \cdot x_2(t_1) = 0 \quad (4)$$

In particular, if for some complex value c (for example, a symbol rotation or a symbol scaling) the relation in Equation (5) (shown below) holds, then the solution set is not a singleton.

$$[x_1(t_2) \cdot x_2(t_2)] = c \cdot [x_1(t_1) \cdot x_2(t_1)] \quad (5)$$

Moreover, even when the solution set has only one solution, the solution introduces a significant noise increase when the determinant of the equation set is relatively small. The noise increase experienced by the channel estimators $h_{m,1}$ and $h_{m,2}$ can be expressed formally as:

$$\frac{|x_2(t_1)|^2 + |x_2(t_2)|^2}{|\text{Det}(t_1, t_2)|^2}; \quad (6)$$

$$\text{Det}(t_1, t_2) = x_1(t_1) \cdot x_2(t_2) - x_1(t_2) \cdot x_2(t_1)$$

$$\frac{|x_1(t_1)|^2 + |x_1(t_2)|^2}{|\text{Det}(t_1, t_2)|^2}; \quad (7)$$

$$\text{Det}(t_1, t_2) = x_1(t_1) \cdot x_2(t_2) - x_1(t_2) \cdot x_2(t_1)$$

Unlike in SISO systems, the channel estimation performance for MIMO systems is substantially highly dependent on the relative location of consecutive symbols as captured by Equations (6) and (7). For large constellations the noise increase can attain very high values. This phenomenon in MIMO systems is the MIMO counterpart to performance deterioration in SISO systems due to the use of low energy symbols in SISO.

In commercial communication systems, pilot signals (which are also referred to simply as pilots) are usually employed for channel estimation. For example, a pilot signal may be present in a transmitted signal one every k sub-carriers. This $k^{th}$ sub-carrier is a non-data sub-carrier and is modulated by a known sequence. The location of the pilot signals along the frequency axis may also change in time in a certain period. The principle drawback of such an embodiment is rate loss. For example, if ⅛ of the data transfer rate is used for pilots then every $8^{th}$ sub-carrier is used as a pilot. In such an embodiment one sub-carrier is used for a first transmit path and another sub-carrier is used for a second transmit path. In this case, 8 consecutive OFDM symbols are used in order to have a pilot every other sub-carrier per a wire pair or communication channel, assuming that the locations of the pilots change in time.

Figure 2:
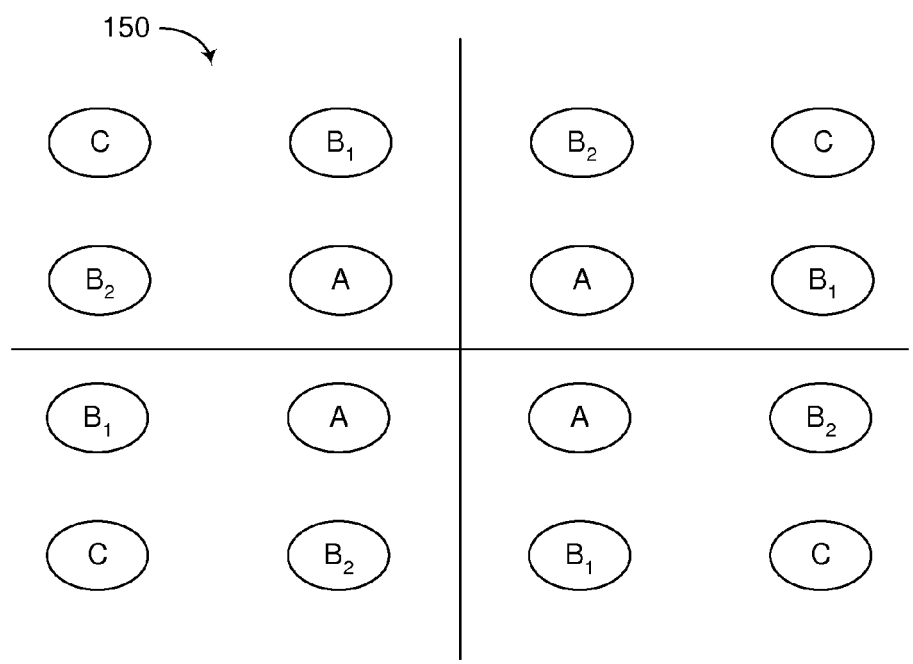
FIG. 2 is a constellation diagram for 16-QAM, constructed and operative in accordance with another embodiment of the disclosed technique.

When the same constellation is used for communication over the two transmit paths, the channel estimation equations cannot be solved (i.e., the condition of Equation (4) is satisfied) with a probability of ½ for BPSK (binary phase-shift keying), ¼ for QPSK (quadrature phase-shift keying), ¹⁄₁₆ for 8-QAM (quadrature amplitude modulation), ⁷⁄₂₅₆ for 16-QAM (calculation shown below) and ¹³³⁄₆₅₅₃₆ (approximately equal to ¹⁄₄₉₃) for 64-QAM. As shown, the larger the constellation the smaller the probability of not being able to solve for the channel estimation. Yet as noted, for larger and denser QAM constellations, the channel estimation is solvable with high probability but can be accompanied by channel estimates which may be very noisy. This is demonstrated in the following example for a 16-QAM encoding technique. Reference is now made to FIG. 2 which is a constellation diagram for 16-QAM, generally referenced 150, constructed and operative in accordance with another embodiment of the disclosed technique. Constellation diagram 150 shows the location of symbols in a 16-QAM setup. Shown below in Table 1, combinations for which Equation (4) is satisfied are listed. Those combinations are the combinations for which $x_1(t_1) \in C$ are symmetrical to those for which $x_1(t_1) \in A$ and combinations for which $x_1(t_1) \in B_2$ are symmetrical to those for which $x_1(t_1) \in B_1$. In Table 1, when a combination achieves equality in Equation (4), it means that for each combination of $[x_1(t_1), x_2(t_1), x_1(t_2)]$ within the specified symbol group there is a single choice (with a probability ¹⁄₁₆) of $x_2(t_2)$ which achieves zero in Equation (4).

TABLE 1

Possible elements in Equation (4)

| $x_1(t_1)$ | $x_2(t_1)$ | $x_1(t_2)$ | $x_2(t_2)$ |
|---|---|---|---|
| A | A | A | A |
| A | A | $B_1$ | $B_1$ |
| A | A | $B_2$ | $B_2$ |
| A | A | C | C |
| A | $B_1$ | A | $B_1$ |
| A | $B_1$ | $B_1$ | — |
| A | $B_1$ | $B_2$ | — |
| A | $B_1$ | C | — |
| A | $B_2$ | A | $B_2$ |
| A | $B_2$ | $B_1$ | — |
| A | $B_2$ | $B_2$ | — |
| A | $B_2$ | C | — |
| A | C | A | C |
| A | C | $B_1$ | — |
| A | C | $B_2$ | — |
| A | C | C | — |
| $B_1$ | A | A | — |
| $B_1$ | A | $B_1$ | A |
| $B_1$ | A | $B_2$ | — |
| $B_1$ | A | C | — |

TABLE 1-continued

Possible elements in Equation (4)

| $x_1(t_1)$ | $x_2(t_1)$ | $x_1(t_2)$ | $x_2(t_2)$ |
|---|---|---|---|
| $B_1$ | $B_1$ | A | A |
| $B_1$ | $B_1$ | $B_1$ | $B_1$ |
| $B_1$ | $B_1$ | $B_2$ | $B_2$ |
| $B_1$ | $B_1$ | C | C |
| $B_1$ | $B_2$ | A | — |
| $B_1$ | $B_2$ | $B_1$ | $B_2$ |
| $B_1$ | $B_2$ | $B_2$ | — |
| $B_1$ | $B_2$ | C | — |
| $B_1$ | C | A | — |
| $B_1$ | C | $B_1$ | C |
| $B_1$ | C | $B_2$ | — |
| $B_1$ | C | C | — |

Thus the probability of getting a quadruplet $[x_1(t_1), x_2(t_1), x_1(t_2), x_2(t_2)]$ for which Equation (4) holds is $$\frac{14}{32} \cdot \frac{1}{16} = \frac{7}{256} = 2.73\%.$$

In order to guarantee channel reconstruction for any combination of transmitted constellation symbols over the two transmit paths, a communication system according to the disclosed technique transmits a rotated version of the constellation symbols over one of the transmit paths every other time instant. For example for the BPSK, QPSK and 8-QAM constellations, a 45° rotation may be used. For these constellations, the 45°-rotated version of the constellations does not coincide with the original constellation symbols. Thus reconstruction of the channel response from two samples of the received signal point at any two consecutive symbol instants is possible.

For large constellations (such as 16-QAM, 32-QAM, 64-QAM and the like), the rotated image of the constellation may include some points which are relatively close to the position of the original constellation points, though not coinciding with these points. For example, a rotated 16-QAM constellation rotated by 45° still does not coincide with the original signal points, yet some symbols (for example ±1±3j, ±3±j), when rotated by 45°, will have a rotated position which is substantially close to the position of another symbol. For example, the angular separation between 1+3j and 3+j is 53.1°.

Another embodiment of the disclosed technique is thus disclosed to accommodate large constellations. In this embodiment, channel reconstruction is executed by expending one information bit in one of the two transmitted data streams. This information bit is lost once every two or more OFDM symbols depending on the refresh rate of the channel estimates. This bit may be used to allow for dual representation of a 1-bit smaller constellation. The chosen representation (i.e., constellation symbol) is the one that maximizes the relation on the left-hand side of Equation (4) or the one for which this relation is non-zero.

According to a further embodiment of the disclosed technique, the two methods described above are integrated. For optimal operation, the rotation scheme can be used to map smaller constellations while for large constellations the dual representation scheme can be used. The two schemes may be integrated into a single symbol with some carriers using one scheme and other carriers using the other. Integrating both schemes results in a solution which minimizes the losses in the channel estimation process for a wider range of spectral efficiencies (i.e., bits per tone).

Another aspect relating to MIMO systems according to the disclosed technique is the selection of the used MIMO scheme or arrangement. Possible MIMO arrangements include a single spatial stream (i.e., transmit diversity and a single transmitter) or multiple spatial streams (spatial multiplexing) for transmitting signals. It should be noted that spatial multiplexing does not always improve performance as compared with a single spatial stream scheme for transmitting signals. For example, due to limitations on the allowed emission level for PLC (power line communication) devices, multiple input transmitters may have to maintain a fixed level for their power spectral densities (PSD). Assuming that a single transmitter is allowed to transmit at a power level of $P_t$ mWatt/Hz for a given band, in the case where N independent transmit streams are used, the power for each stream has to be reduced by a factor of 1/N. Using the example of two transmitters, the power for each independent transmitter has to be reduced by 3 dB. For some MIMO channels, it is possible that the loss due to the requirement of lowering the transmit power will exceed the improvement due to the use of the multiple spatial streams scheme. Other examples of such scenarios include cases where the channel matrix is nearly diagonal (i.e., two approximately independent channels) where one path has a high SNR (signal-to-noise ratio), and hence a high capacity, while the other path has a very low capacity. In this case, the optimal configuration for the transmitter would be to use only a single transmitter, selected based on its equivalent received SNR measure at the single port or multi-port receiver. In this case, using the other, very low SNR channel will not contribute to network performance. Moreover, the capacity of the high SNR channel will drop as its SNR decreases due to the lower transmit power. Other cases also exist where the combination of channel and noise characteristics results in a decision to use a single spatial stream for some carriers and multiple spatial streams for other carriers.

Power line communication (herein abbreviated PLC) channels are characterized by large variations in their channel and noise characteristics over a received band and thus in the resulting SNR. According to the disclosed technique, both transmission arrangements mentioned above are integrated into the same OFDM symbol. Some sub-carriers can be transmitted via a single spatial stream scheme (for example a single transmitter or using beamforming over multiple transmitters) while other sub-carriers may use a spatial multiplexing scheme to convey multiple spatial streams by multiple transmitters. According to the disclosed technique, the transmit scheme is correlated to the estimated line characteristics, for example, error rate information, channel and noise characteristics as well as the resulting SNR as a function of frequency (sub-carrier index). As an example, sub-carriers with highly asymmetrical SNR conditions (i.e., sub-carriers for which one of the MIMO channels exhibits a significantly higher SNR over the other channels) will use a single spatial stream scheme for transmission while SNR-balanced sub-carriers may use a spatial multiplexing scheme for transmission.

According to the disclosed technique, the selection process between the two transmit schemes (single spatial stream, for example, a SISO scheme, or multiple spatial streams, i.e. a MIMO scheme) may be implemented on the receiver side, although the selection process can also be implemented on the transmitter side. The receiver estimates the line characteristics along the received band. According to one embodiment of the disclosed technique, the receiver provides the estimated line characteristics as raw, unprocessed data to the transmitter. The transmitter analyzes the raw data and then decides which transmission scheme to use per sub-carrier. According to another embodiment of the disclosed technique, the receiver analyzes the estimated line characteristics and provides the analyzed data to the transmitter. The transmitter then decides based on the analyzed data which transmission scheme to use per sub-carrier. According to a further embodiment of the disclosed technique, the receiver analyzes the estimated line characteristics and the receiver then decides which transmission scheme to use per sub-carrier. As described below, the receiver can transmit the selected transmission scheme per sub-carrier to the transmitter. Based on the above estimated variables, such as channel characteristics, noise characteristics and the resultant SNR, a selection is made for the appropriate transmit scheme per carrier or per groups of carriers. The selection is usually done by calculating the expected performance of each scheme based on the estimated line characteristics and selecting the one that maximizes performance. In one embodiment, this selection is communicated to the transmitter. Typically, in OFDM, the receiver also communicates to the transmitter end the selected bit allocation (constellation) per each one of the used sub-carriers (tones). In the proposed combined single spatial stream/multiple spatial streams OFDM transmission, the receiver may communicate to the transmitter end t bit-loading numbers per each used sub-carrier which represent the selected constellations for transmission over that sub-carrier by each one of the spatial streams. In particular, if a single spatial stream is selected for that sub-carrier, the bit-loading numbers associated with the remaining streams may be set to zero. As the varying line characteristics are constantly monitored, changes in the measured characteristics may result in revised selections between the two transmit schemes. The bit-loading numbers can be determined by known bit-loading algorithms.

It is noted that if a multiple spatial stream transmit scheme is selected, then depending on the setup of a communication system, different embodiments of a multiple spatial stream transmit scheme may be used. For example, the multiple spatial stream transmit scheme may involve a direct transmission of two data streams through two transmit ports, a direct transmission of three data streams through three transmit ports or a direct transmission of four data streams through four transmit ports using a spatial mapping matrix. Other examples include a transmission of two data streams through three transmit ports using a spatial mapping matrix (spatial expansion), a transmission of two data streams through four transmit ports using a spatial mapping matrix and a transmission of three data streams through four transmit ports using a spatial mapping matrix. Further examples of a multiple spatial stream transmit scheme can include a transmission of two data streams through two transmit ports using a spatial mapping matrix, a transmission of three data streams through three transmit ports using a spatial mapping matrix, a transmission of four data streams through four transmit ports using a spatial mapping matrix and a space-time transmit diversity scheme. Another example of possible multiple spatial stream transmit schemes includes open-loop MIMO schemes as well as closed-loop MIMO schemes.

The above analysis assumed equal power allocation between the transmit channels. Generally speaking, a spatial multiplexing only transmission scheme may be used with optimal power allocation. In theory (but not necessarily in practice), this scheme cannot be inferior to a single spatial stream scheme as the latter is a special case of SM when all but a single spatial stream are allocated zero power (for given OFDM sub-carriers).

According to the disclosed technique, a simplified optimal power allocation scheme can be used with just two options: spatial multiplexing with equal power allocation between the transmission ports or a single spatial stream (e.g., a single transmitter) scheme as previously described. The single spatial stream scheme refers to an example where all aggregate power is allocated to each sub-carrier of the selected spatial stream.

A more advanced scheme may add optimal power allocation to the network. In such an advanced scheme, in addition to possibly selecting the transmit scheme over different carriers (a single spatial stream or multiple spatial streams), transmissions of multiple spatial streams may allocate their transmit power in an optimal manner or select it from a predefined finite set of power settings for the multiple spatial streams. It is possible that one spatial stream, or sub-channel, may use a first transmit power while the other spatial stream (or transmit path or sub-channel) will use a second transmit power, where the first and second transmit powers are different. The power allocation is calculated to maximize the network capacity for spatial streams under some constraint, for example, maintaining the total PSD constraint which sets the limit for the maximum total PSD level over frequency. The calculated power allocation may also change over time as line conditions vary.

Prior art MIMO OFDM systems, such as IEEE Std 802.16e (WiMAX) and IEEE Std 802.11n (WiFi), impose the same transmission scheme over all used data sub-carriers. As such, either all of the data sub-carriers use the single spatial stream configuration or the same multiple spatial stream over multiple transmit port scheme. Usually, these prior art systems use the same bit-loading over all data sub-carriers. These prior are systems are used over the wireless or cellular channel which changes rapidly in time. For these channels, the rate of the feedback channel required to communicate the selected bit-loading and transmit configuration (single or multiple spatial stream transmission) per sub-carrier in response to the varying channel conditions is substantially high. However, according to the disclosed technique, for frequency-selective, relatively slowly varying channels (for example, wireline channels) it is possible to significantly improve the performance of a MIMO-OFDM system by allowing each sub-carrier to use the optimal transmission configuration for that sub-carrier among the supported transmit configurations (single spatial stream transmission schemes and multiple spatial stream transmission schemes of different types).

The decision regarding the transmission parameters (bit-loading and transmission scheme) per sub-carrier may be based on some training signal which is usually prepended to the transmitted data frame. This training signal is used to estimate the channel transfer function from the different transmit ports, or spatial streams, to the various receiving ports. The data transmission that follows this training signal may be used to track the channel changes and adapt the transmission parameters to the changes in the following frames by communicating the new set of transmission parameters to the transmitter. According to another embodiment of the disclosed technique, the training signal may be replaced by at least one transmit signal. The at least one transmit signal is then used to estimate the channel transfer function from the different transmit ports, or spatial streams, to the various receiving ports. In this embodiment, the selection of the transmission parameters is according to the transmit signal. The at least one transmit signal can be at least one frame header, at least one payload session, at least one training sequence, at least one preamble, at least one probe signal, at least one special channel estimation training sequence and the like.

Based on the estimated channel matrix response, the receiver may decide on the appropriate transmission parameters in two steps. In a first step, the receiver decides on the best or most appropriate transmission scheme (either using a one spatial stream transmission or a multiple spatial stream transmission) per each data sub-carrier or per each group of consecutive sub-carriers. In a second step thereafter, given the selected configurations for the whole set of data sub-carriers, the receiver decides on the bit-loading, i.e. the number of bits conveyed over each sub-carrier and for each spatial stream (either a single spatial stream or multiple spatial streams, depending on the selected transmission scheme). As mentioned above, the bit-loading can be determined by known bit-loading algorithms. Alternatively, the receiver may decide on both transmission parameters jointly. In a preferred embodiment of the disclosed technique, the receiver communicates the transmission parameters, bit-loading and selected transmission configuration, per sub-carrier to the transmitter end. This information may be compressed to groups of sub-carriers with the same bit-loading and/or transmission configuration. In another alternative, the selected MIMO configuration may be derived from the bit-loading table.

In another embodiment of the disclosed technique, the receiver may convey to the transmitter raw or unprocessed channel estimates and/or line estimates which it measured, or other channel quality measures. The receiver may also convey to the transmitter a processed version of the above measures. According to this embodiment, the transmitter processes this data and decides, on a sub-carrier basis, as to which transmission scheme to use (i.e., either a single spatial stream or a multiple spatial stream transmission scheme).

The composite MIMO channel comprises multiple channels which may thus carry independent data streams (spatial streams) simultaneously from one end of the system to the other end. In general, the number of streams that may be conveyed by a MIMO system is equal to the rank of the composite MIMO channel. These multiple streams may be simultaneously communicated from the system transmitter to the receiver end. In general, the transmitted data in MIMO systems is arranged in multiple spatial streams in order to utilize the spatial dimension. The rank of a MIMO channel with $N_{Tx}$ transmit ports and $N_{Rx}$ receive sensors is less than or equal to the smaller number among these two. Thus, in order to communicate $N_{ss}$ spatial streams, the transmitter should be equipped with at least $N_{Tx}$ transmit ports, where $N_{Tx}=N_{ss}$. According to the disclosed technique, the transmission configuration (i.e. the number of spatial streams) may vary from sub-carrier to sub-carrier in a MIMO-OFDM system. The bit-loading matrix may be arranged in an $N_{sc} \times N_{ss}$ matrix, such as a bit allocation table (also abbreviated as a BAT), where $N_{sc}$ denotes the total number of OFDM sub-carriers, or data sub-carriers, and $N_{ss}$ denotes the maximum (over all data sub-carriers) spatial streams in the MIMO configuration. In this case, the bit-loading table which may be arranged in streams will comprise multiple values for a sub-carrier set to a multi-port (multi-stream) configuration while sub-carriers communicating a single spatial stream are associated with a single non-zero bit-loading value which corresponds to the selected spatial stream for that sub-carrier. As shown below, each spatial stream of the selected transmit scheme is mapped to at least one transmit port of a transmitter. The mapping may be one-to-one (direct mapping), where each spatial stream is mapped to a corresponding transmit port. The mapping may also be one-to-many, where each spatial stream is mapped to more than one transmit port of the transmitter.

Figure 3A:
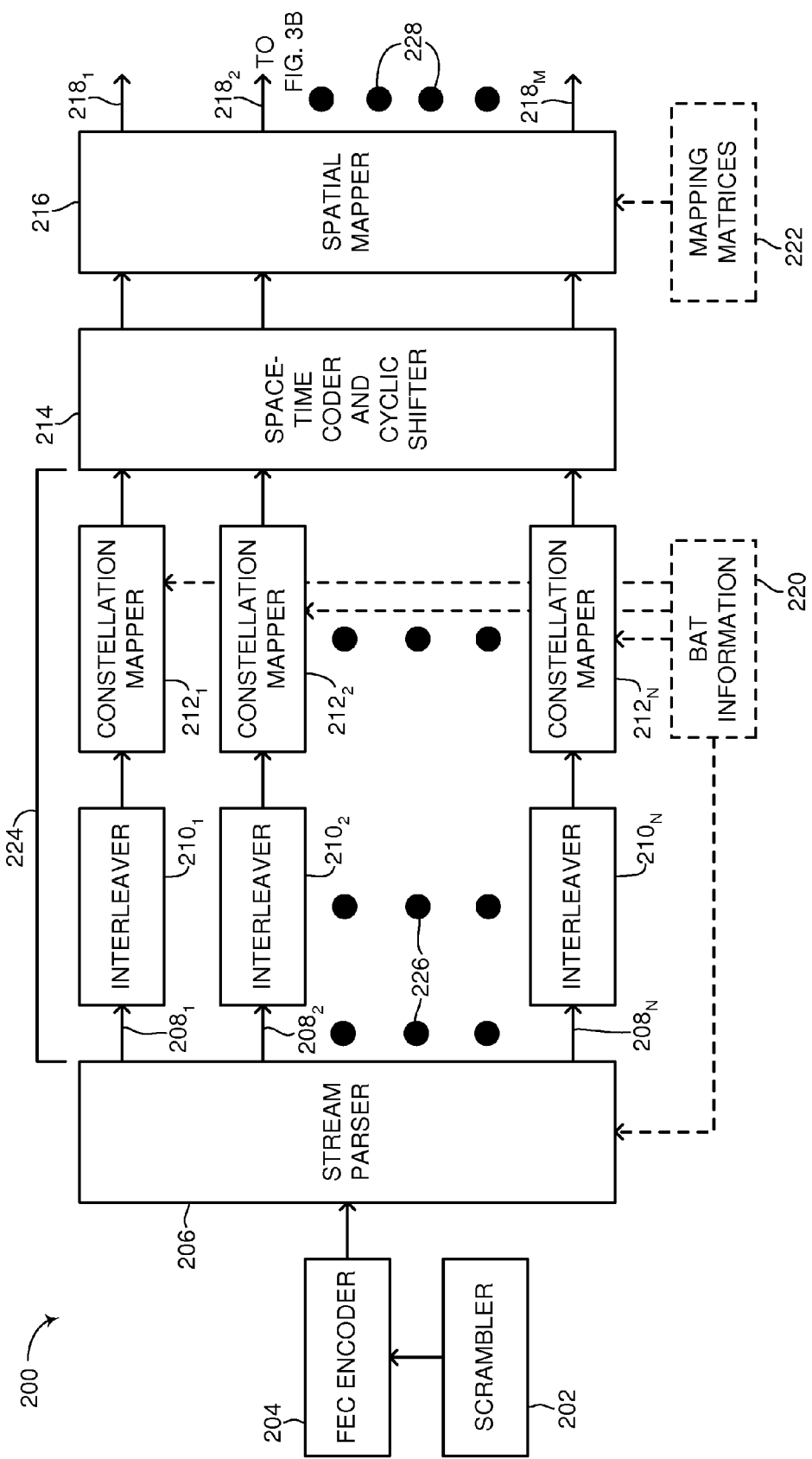
FIGS. 3A and 3B are schematic illustrations of a transmitter section of a communication system, constructed and operative in accordance with a further embodiment of the disclosed technique.
Figure 3B:
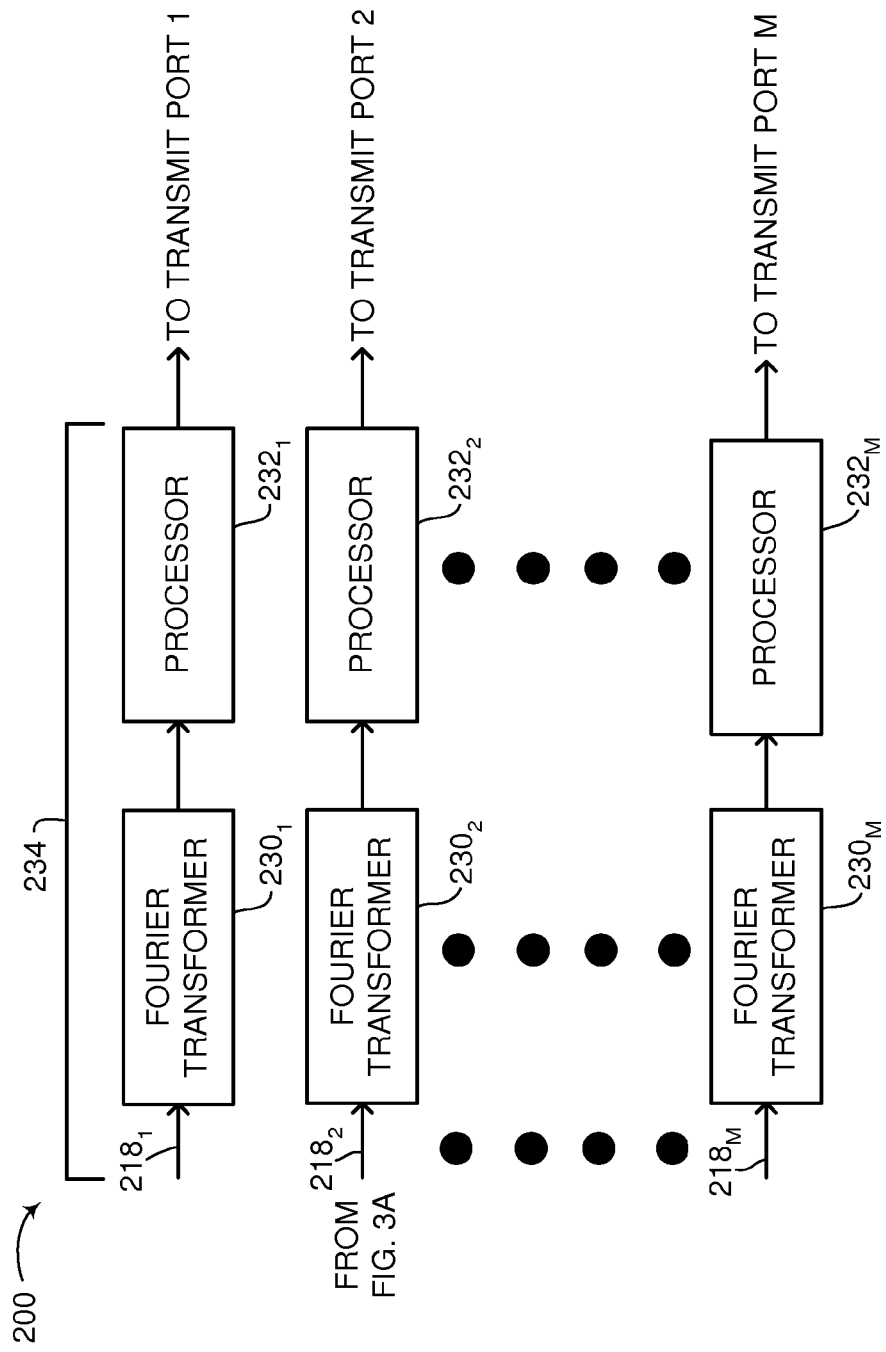

FIGS. 3A and 3B are schematic illustrations of a transmitter section of a communication system, generally referenced 200, constructed and operative in accordance with an embodiment of the disclosed technique. Transmitter section 200 includes a scrambler 202, a forward error correction (herein abbreviated FEC) encoder 204, a stream parser 206, a plurality of single stream paths $208_1$, $208_2$ and $208_N$, a plurality of interleavers $210_1$, $210_2$ and $210_N$, a plurality of constellation mappers $212_1$, $212_2$ and $212_N$, a space-time coder and cyclic shifter 214, a spatial mapper 216, a plurality of transmit paths $218_1$, $218_2$ and $218_M$, a plurality of Fourier transformers $230_1$, $230_2$ and $230_M$ and a plurality of processors $232_1$, $232_2$ and $232_M$. FEC encoder 204 is coupled with scrambler 202 and stream parser 206. Each one of single stream paths $208_1$, $208_2$ and $208_N$ couples stream parser 206 with space-time coder and cyclic shifter 214 via a respective interleaver coupled with a respective constellation mapper. Each one of single stream paths $208_1$, $208_2$ and $208_N$ entering space-time coder and cyclic shifter 214 respectively couples space-time coder and cyclic shifter 214 to spatial mapper 216. Spatial mapper 216 outputs plurality of transmit paths $218_1$, $218_2$ and $218_M$. Each one of plurality of transmit paths $218_1$, $218_2$ and $218_M$ is coupled with a respective Fourier transformer which in turn is coupled with a respective processor, as shown in FIG. 3B. Plurality of single stream paths $208_1$, $208_2$ and $208_N$ are denoted by a bracket 224 (FIG. 3A) whereas plurality of transmit paths $218_1$, $218_2$ and $218_M$ are denoted by a bracket 234 (FIG. 3B). In general, each single stream path between stream parser 206 and space-time coder and cyclic shifter 214 is parallel to every other path between stream parser 206 and space-time coder and cyclic shifter 214. Also, the number of single stream paths, denoted by the index N, may be equal to or smaller than the number of transmit paths, denoted by the index M. This is shown in FIGS. 3A and 3B by a plurality of dots 226 and 228, which denote the plurality of elements under brackets 224 and 234. In general, N may be less than M, therefore as shown, plurality of dots 226 includes less dots than plurality of dots 228.

It is noted that scrambler 202, plurality of interleavers $210_1$, $210_2$ and $210_N$ and space-time coder and cyclic shifter 214 are optional components in transmitter section 200. In an embodiment of the disclosed technique in which those optional components are not included then stream parser 206 would be coupled with spatial mapper 216 directly via plurality of constellation mappers $212_1$, $212_2$ and $212_N$ (not shown). It is also noted that FEC encoder 204 may be replaced by a plurality of FEC encoders (not shown).

In general, information data to be transmitted by transmitter section 200 may be first optionally scrambled by scrambler 202 and then encoded by FEC encoder 204. Stream parser 206 then divides the bits of the encoded information data and outputs them to plurality of single stream paths $208_1$, $208_2$ and $208_N$ in accordance with the rank of the MIMO configuration. Transmitter section 200 may be a vertical MIMO transmitter. For a transmitter operated in accordance with the disclosed technique, the number of single stream paths is set to N, which represents the maximum MIMO configuration, i.e. the maximum number of spatial streams over all the data sub-carriers. The process of distributing the output of FEC encoder 204 to multiple single path streams via stream parser 206 is based on a bit-loading matrix, shown in FIG. 3A as a BAT (bit allocation table) information 220, which provides the BAT to stream parser 206 and each one of plurality of constellation mappers $212_1$, $212_2$ and $212_N$. The number of bits drawn for each sub-carrier and spatial stream combination is equal to the entry of the bit-loading matrix for that combination. The different bit streams of the plurality of single spatial streams are then mapped to constellation symbols, either after interleaving by plurality of interleavers $210_1$, $210_2$ and $210_N$ or without interleaving.

The constellation symbols of each spatial stream are arranged according to the sub-carrier index. The data symbols of the different spatial streams for each sub-carrier are processed and mapped to the appropriate sub-carrier with a multi-port configuration. Single spatial stream sub-carriers are associated with a constellation symbol of only one of the spatial streams. The multiple spatial streams at the output of plurality of constellation mappers $212_1$, $212_2$ and $212_N$ are routed to spatial mapper 216. The output of plurality of constellation mappers $212_1$, $212_2$ and $212_N$ may optionally undergo space-time encoding and cyclic shifting by space-time coder and cyclic shifter 214. The spatial mapping executed by spatial mapper 216 may use a plurality of mapping matrices 222 as input. The output of spatial mapper 216 is plurality transmit streams $218_1$, $218_2$ and $218_M$. As mentioned above, the N spatial single path streams may map to a larger number M of transmit streams. After further processing, this plurality of transmit streams is transmitted through different transmit ports. For sub-carriers using a single spatial stream configuration, the information from the appropriate spatial stream is mapped to either a single or multiple transmit stream used for that sub-carrier (not shown in FIGS. 3A and 3B). For multiple spatial stream sub-carriers, the constellation points taken from the plurality of spatial single path streams for that sub-carrier are mapped by an M×N matrix. This matrix may take different forms. It may be selected to be a zero/one direct mapping matrix (either common to all sub-carriers with the multiple spatial stream transmission configuration or be sub-carrier dependent) or some complex-valued precoding (e.g. beamforming) matrix. In this context, when a sub-carrier dependent spatial mapping matrix is used, the receiver may communicate to the transmit end the required mapping matrix (or the raw channel matrix response) only for the sub-carriers using a multi-port transmission configuration. In a MIMO-OFDM system, plurality of transmit streams $218_1$, $218_2$ and $218_M$ are transformed to the time domain using plurality of Fourier transformers $230_1$, $230_2$ and $230_M$ which may execute an inverse discrete Fourier transform (herein abbreviated IDFT). The time-domain transmit streams are then routed to corresponding transmit ports, such as transmit port 1, transmit port 2 and transmit port M, for transmission after some processing, respectively, by processors $232_1$, $232_2$ and $232_M$. The processing may include the insertion of the cyclic prefix, windowing as well as digital and/or analog processing, such as filtering, amplification and frequency up-conversion.

A receiver (not shown) used with the transmitter section of FIGS. 3A and 3B, operative in accordance with the disclosed technique, is similar to a conventional MIMO receiver. Such a receiver includes a plurality of processing units (not shown) which are the counterpart to the corresponding processing units used in transmitter section 200. The transmitted signal (not shown) is received by L receive ports (not shown), where L>N, with N denoting the maximum spatial streams, over all data sub-carriers, in the MIMO configuration, as mentioned above. After some time-domain processing of the received multiple streams, each received stream is transformed into the frequency-domain by a fast Fourier transform (herein abbreviated FFT). Some spatial processing may subsequently follow the FFT, for example, QR decomposition. Thereafter, the receiver applies the appropriate detection process, for each sub-carrier, according to the selected transmission scheme of transmitter section 200 for each sub-carrier. This detection process may include joint MIMO detection, maximum ratio combining (herein abbreviated MRC) for sub-carriers with a single spatial stream configuration, and the like. A detector (not shown) in the receiver will usually generate soft values that will feed an FEC decoder (not shown) after de-interleaving (if required) and after composing the bits associated with the different spatial streams into a single integral stream in accordance with the stream parsing executed by transmitter section 200.

The invention claimed is:

1. A method for transmitting and receiving signals over at least one channel between at least one transmitter and at least one receiver, said at least one channel comprising at least two different groups of sub-carriers, each one of said at least two different groups comprising at least one sub-carrier, comprising:
   estimating at least one line characteristic of said at least one channel;
   selecting a transmission scheme for each group of said at least two different groups of sub-carriers according to said estimated at least one line characteristic;
   wherein said transmission scheme is selected between a single transmit port transmission scheme and a multiple transmit port transmission scheme; and
   applying a respective power allocation scheme to each one of said at least one sub-carrier for each transmit path used;
   wherein said respective power allocation scheme is selected from a list consisting of:
     allocating equal power to each at least one transmit path used for a respective sub-carrier;
     allocating all power to a single transmit path used for a respective sub-carrier; and
     allocating power to each at least one transmit path used for a respective sub-carrier according to a predefined finite set of power settings for a plurality of transmit paths.

2. The method according to claim 1, wherein said at least one line characteristic is selected from a list consisting of:
   a channel estimate;
   a noise estimate;
   a resultant signal-to-noise ratio (SNR); and
   error rate information.

3. The method according to claim 1, wherein said at least one channel is a wireless channel.

4. The method according to claim 1, wherein said at least one channel is a power line communication (PLC) channel.

5. The method according to claim 1, wherein said procedure of selecting comprises the sub-procedures of:
   determining an expected performance of said single transmit port transmission scheme and said multiple transmit port transmission scheme based on said at least one line characteristic; and
   selecting said transmission scheme for each group which maximizes said expected performance.

6. The method according to claim 1, further comprising the procedure of deciding on a number of bits to be transmitted for each one of said at least two different groups of sub-carriers and for each transmit port of said selected transmission scheme using a bit-loading algorithm.

7. The method according to claim 1, wherein said procedure of selecting is executed by said at least one receiver.

8. The method according to claim 7, further comprising the procedure of said at least one receiver transmitting said selected transmission scheme to said at least one transmitter.

9. The method according to claim 8, wherein said procedure of transmitting said selected transmission scheme comprises the sub-procedure of transmitting a selected constellation for transmission to said at least one transmitter.

10. The method according to claim 8, wherein said procedure of transmitting said selected transmission scheme comprises the sub-procedure of transmitting at least one bit-loading number, said at least one bit-loading number representing a selected constellation for transmission to said at least one transmitter.

11. The method according to claim 1, wherein said procedure of selecting is executed by said at least one transmitter.

12. The method according to claim 1, wherein said multiple transmit port transmission scheme is selected from a list consisting of:
   a direct transmission of two data streams through two transmit ports;
   a transmission of two data streams through two transmit ports using a spatial mapping matrix;
   a transmission of two data streams through three transmit ports using a spatial mapping matrix;
   a transmission of two data streams through four transmit ports using a spatial mapping matrix;
   a direct transmission of three data streams through three transmit ports;
   a transmission of three data streams through three transmit ports using a spatial mapping matrix;
   a transmission of three data streams through four transmit ports using a spatial mapping matrix;
   a direct transmission of four data streams through four transmit ports using a spatial mapping matrix;
   a transmission of four data streams through four transmit ports using a spatial mapping matrix; and
   a space-time transmit diversity scheme.

13. The method according to claim 1, wherein each one of said at least one sub-carrier is defined by a corresponding at least one orthogonal frequency-division multiplexing (OFDM) sub-carrier.

14. The method according to claim 1, further comprising the procedures of:
   transmitting over said at least one channel, from each one of said at least one transmitter, a training sequence to each one of said at least one receiver; and
   receiving, from each one of said at least one receiver, said training sequence,
   wherein said estimated at least one line characteristic is determined according to said training sequence.

15. The method according to claim 1, further comprising the procedures of:
   transmitting over said at least one channel, from each one of said at least one transmitter, at least one transmit signal to each one of said at least one receiver; and
   receiving, from each one of said at least one receiver, said at least one transmit signal,
   wherein said estimated at least one line characteristic is determined according to said at least one transmit signal.

16. The method according to claim 15, wherein said at least one transmit signal is selected from a list consisting of:
   at least one frame header;
   at least one payload session;
   at least one training sequence;
   at least one preamble;
   at least one probe signal; and
   at least one special channel estimation training sequence.

17. The method according to claim 1, wherein said procedure of estimating said at least one line characteristic is executed at pre-determined time intervals.

18. The method according to claim 17, wherein said pre-determined time intervals are time intervals of hundreds of milliseconds.

19. A method for transmitting and receiving signals over at least one channel between at least one transmitter and at least one receiver, said at least one channel comprising at least two different groups of sub-carriers, each one of said at least two different groups comprising at least one sub-carrier, comprising:

estimating at least one line characteristic of said at least one channel;

selecting a transmission scheme for each group of said at least two different groups of sub-carriers according to said estimated at least one line characteristic;

wherein said transmission scheme is selected between a single transmit port transmission scheme and a multiple transmit port transmission scheme; and applying a respective power allocation scheme to each one of said at least one sub-carrier for each transmit path used;

said respective power allocation scheme comprising allocating power optimally to each at least one transmit path used for a respective sub-carrier, wherein a first one of said at least one transmit path is allocated a first transmit power, a second one of said at least one transmit path is allocated a second transmit power and wherein said first transmit power and said second transmit power are different.

20. The method according to claim 19, wherein said optimally allocated power is allocated to maximize a network capacity for a plurality of transmit paths while maintaining a total power spectral density constraint.

21. A transmitter, for transmitting data over at least one channel between said transmitter and at least one receiver, said at least one channel comprising at least two different groups of sub-carriers, each one of said at least two different groups comprising at least one sub-carrier, the transmitter comprising:

a stream parser for dividing said data to be transmitted into a plurality of single stream paths, wherein said stream parser divides said data to be transmitted according to bit allocation information;

wherein said bit allocation is indicative of a transmission scheme for each group of said at least two different groups of sub-carriers;

wherein said transmission scheme is selected between a single transmit port transmission scheme and a multiple transmit port transmission scheme;

wherein said selected transmission scheme is based upon an estimate of at least one line characteristic of said at least one channel;

wherein a respective power allocation scheme is applied to each one of said at least one sub-carrier for each transmit path used;

wherein said respective power allocation scheme is selected from a list consisting of:

allocating equal power to each at least one transmit path used for a respective sub-carrier;

allocating all power to a single transmit path used for a respective sub-carrier; and allocating power to each at least one transmit path used for a respective sub-carrier according to a predefined finite set of power settings for a plurality of transmit paths.

22. The transmitter according to claim 21, further comprising:

a plurality of constellation mappers, coupled with said stream parser via said plurality of single stream paths, for respectively mapping said data to be transmitted of each one of said plurality of single stream paths to a plurality of constellation symbols;

a spatial mapper, coupled with said plurality of constellation mappers, for spatially mapping said constellation symbols to a plurality of transmit paths;

a plurality of Fourier transformers, coupled with said spatial mapper, for transforming said plurality of transmit paths to a plurality of time-domain transmit streams; and a plurality of processors, respectively coupled with said plurality of Fourier transformers, for processing said plurality of time-domain transmit streams and for routing said plurality of time-domain transmit streams to respective transmit ports of said transmitter.

23. The transmitter according to claim 21, wherein said transmitter is a vertical multiple-input and multiple-output (MIMO) transmitter.

24. The transmitter according to claim 21, wherein said bit allocation information is arranged as a bit allocation table (BAT).

25. The transmitter according to claim 21, wherein said bit allocation information is received from said at least one receiver.

26. The transmitter according to claim 21, wherein said bit allocation information is generated by said transmitter according to said estimate of at least one line characteristic of said at least one channel received from said at least one receiver, and wherein said estimate is analyzed data from said at least one receiver.

27. The transmitter according to claim 21, wherein said bit allocation information is generated by said transmitter according to said estimate of at least one line characteristic of said at least one channel received from said at least one receiver, and wherein said estimate is raw data from said at least one receiver.

28. The transmitter according to claim 22, further comprising:

at least one forward error correction (FEC) encoder, coupled with said stream parser, for encoding said data to be transmitted;

a scrambler, coupled with said at least one FEC encoder, for scrambling said data;

a plurality of interleavers, respectively coupled with said plurality of constellation mappers and said stream parser between said plurality of constellation mappers and said stream parser, for respectively interleaving said encoded data mapped to each one of said plurality of single stream paths; and a space-time coder and cyclic shifter, coupled with said plurality of constellation mappers and said spatial mapper between said plurality of constellation mappers and said spatial mapper, for space-time encoding and cyclic shifting said plurality of constellation symbols.

29. The transmitter according to claim 22, wherein said processing is selected from a list consisting of:

inserting a cyclic prefix;
windowing;
filtering;
amplification;
frequency up-conversion;
digital processing; and
analog processing.

30. The transmitter according to claim 22, wherein each one of said plurality of single stream paths is spatially mapped to a respective one of said plurality of transmit paths.

31. The transmitter according to claim 22, wherein each one of said plurality of single stream paths is spatially mapped to at least one respective one of said plurality of transmit paths.

32. The transmitter according to claim 22, wherein said plurality of Fourier transformers transform said plurality of transmit paths to said plurality of time-domain transmit streams using an inverse discrete Fourier transform.

33. The transmitter according to claim 22, wherein said spatial mapper uses a plurality of mapping matrices to spatially map said constellation symbols.

* * * * *